United States Patent [19] [11] 4,373,644
Bennett [45] Feb. 15, 1983

[54] CHILD RESISTANT TYPE TRIGGER ACTUATED PUMP DISPENSER

[76] Inventor: Robert A. Bennett, 170 Sturbridge Rd., Easton, Conn. 06425

[21] Appl. No.: 234,928

[22] Filed: Feb. 17, 1981

[51] Int. Cl.³ .................... B05B 11/00; G01F 11/04
[52] U.S. Cl. .................... 222/153; 222/384; 239/357
[58] Field of Search .................... 222/153, 207, 309, 384, 222/402, 402.11; 239/359, 526

[56] References Cited

U.S. PATENT DOCUMENTS

| | | | |
|---|---|---|---|
| 3,517,668 | 6/1970 | Brickson | 222/309 X |
| 3,590,691 | 7/1971 | Magers | 222/384 X |
| 3,749,290 | 7/1973 | Micallef | 222/207 |
| 4,142,654 | 3/1979 | Doubleday et al. | 222/309 |
| 4,182,465 | 1/1980 | Bennett | 222/207 |
| 4,220,285 | 9/1980 | Gualdi | 222/153 X |
| 4,278,187 | 7/1981 | Luedtke | 222/153 |

*Primary Examiner*—F. J. Bartuska

[57] ABSTRACT

A manually operable trigger pump has a pump body, a circular cap disposed below the body and adapted to engage a container having material to be pumped out, a generally vertical trigger pivotally coupled at its upper end to the body and a linkage coupled at one end to the trigger intermediate its ends and extending inclinedly upwards from the coupled end into the body. A locking device is securable to and is manually rotatable about the cap. A generally horizontal arm integral at one end with the device extends radially outward from the cap. The arm has a radially extending recess in its top surface. The device is rotatable to a locked position at which the other end of the arm is aligned with but is inwardly spaced from the trigger and the linkage engages the recess. At this point, when the trigger is squeezed, the movement between the trigger and the other end of the arm is insufficient to actuate the pump, but is large enough to raise the linkage partially out of the recess. However, if the means is rotated to move the other end of the arm out of alignment with the trigger while the trigger remains squeezed, the linkage will be raised completely out of the recess. The pump is then unlocked and can be operated normally.

10 Claims, 7 Drawing Figures

CHILD RESISTANT TYPE TRIGGER ACTUATED PUMP DISPENSER

BACKGROUND OF THE INVENTION

Disposable or rechangeable liquid spray dispensers are widely used. Typically, such dispensers employ a liquid carrying container with a manually operable pump connected thereto. These dispensers are designed for ease of operation and typically can be operated by young children as well as adults. Under certain conditions, as for example when the liquid is a poison such as an insecticide, safety regulations require the pump to be of child resistant type, i.e., that the pump should be so designed that it can be locked into an inoperative position and when so locked, that it cannot be unlocked by a young child. In order to satisfy this design requirement, the unlocking action must be of a type which requires the operator to perform two dissimilar operations on the pump to unlock it.

This invention enables a manually operable pump used in such dispensers to be made child resistant by novel inexpensive means.

SUMMARY OF THE INVENTION

In accordance with the principles of this invention, a manually operable pump has a pump body connected by a vertically downwardly extending throat by a circular internally threaded cap to a container having material to be pumped out. A generally vertical trigger is pivotally coupled at its upper end to the body and is disposed alongside the throat and cap. A linkage is coupled at one end to the trigger at a point intermediate the ends of the trigger and extends inclinedly upwards from the coupled end into the body. When the trigger is squeezed, it is pivoted in a vertical plane toward the body and, normally, will initiate the pumping process.

In order to provide the desired child resistant function, locking means is secured to and is manually rotatable about the cap. A generally horizontal arm, integral at one end with the means, extends radially outward from the cap. The arm has a radially extending recess in its top surface.

The means is rotatable to a locking position at which the other end of the arm is aligned with, but is spaced inwardly from, the trigger and at which the linkage engages the recess. The separation between the other end of the arm and the trigger is so small that, when the trigger is squeezed, the trigger will butt up against the other end and cannot move further. The total permitted movement of the trigger is insufficient to actuate the pump. However, the separation between the other end of the arm and the trigger is sufficiently large that when the trigger abuts the other end, the linkage is moved upward and is partially disengaged from the recess.

At this point, the means can be rotated manually to move the other end out of alignment with the trigger whereby the linkage will be completely disengaged from the recess. The pump is then unlocked and the trigger can be squeezed in the normal manner to operate the pump.

DETAILED DESCRIPTION OF PREFERRED EMBODIMENT

Figure 1:
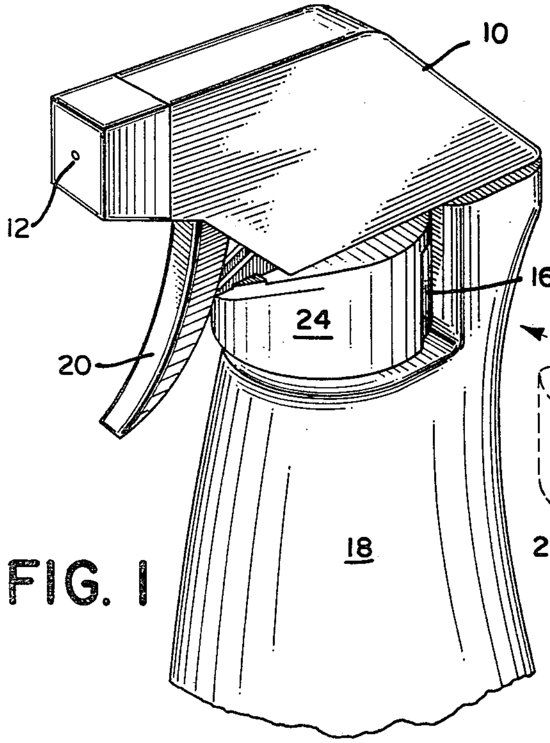
FIG. 1 is a perspective view of a trigger pump with a child resistant locking device separated therefrom.
Figure 2:
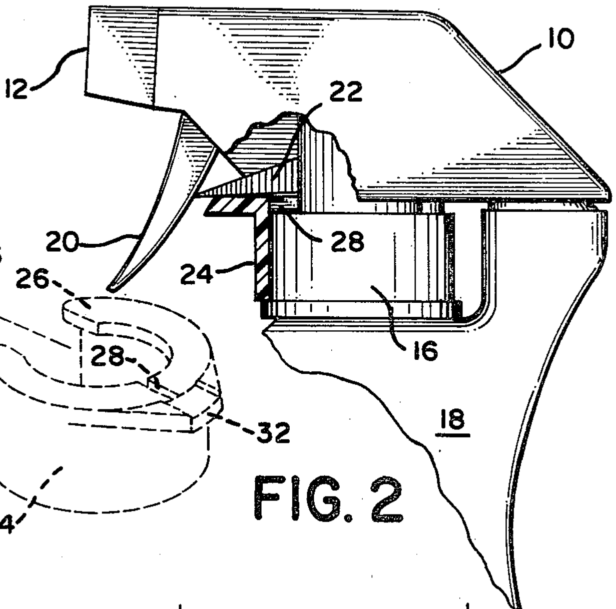
FIG. 2 is a detail partially cut away side view of the pump of FIG. 1 with the device of FIG. 1 secured thereto in locking position.
Figure 5:
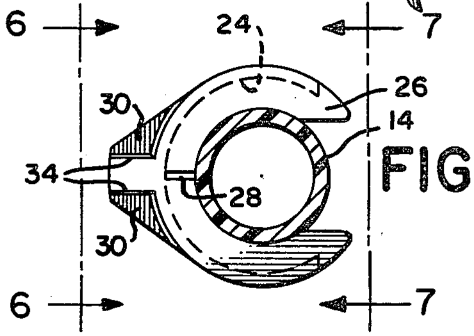
FIG. 5 is a plan view of the device shown in position about the throat of the pump.

Referring now to FIGS. 1-7, a known type of trigger pump has a valve body 10 with a discharge nozzle 12 and a bottom vertical throat 14. The throat extends through a central opening in a circular cap 16 which detachably secures the throat to the neck of a container 18 of a suitable liquid substance. A trigger 20, generally vertical is pivotally secured at its upper end within the body 10. A linkage 22 is coupled at one end to the trigger 20 at a point intermediate the ends of the trigger and extending slightly inclinedly upwards into the body. The linkage is moved into the body when the trigger is squeezed and is pivoted in a vertical plane into the body of the valve. This pump can be of the types shown, for example, in U.S. Pat. Nos. 3,749,290 or 4,182,465. When the trigger is squeezed, a spray is discharged from the nozzle. When trigger pressure is released, the trigger will return automatically to its initial position.

In order to make the trigger pump child resistant, it is necessary to enable the pump to be locked in such manner that the spray cannot be produced by squeezing the trigger and further, to insure that any user must use a combination of two different types of motions to unlock the pump and enable it to be used in normal manner.

A child resistant locking device shown in phantom in FIG. 1 and elsewhere in solid line is detachably secured to the pump to provide the desired type of action.

The device includes an annular member 24 hollow and vertically disposed, open at both ends and in horizontal cross section having the general shape of a C. A flat top section 26 of the like C shape but somewhat wider is integral with and overlies member 24. Section 26 has a flat top horizontal surface. A radial slot 28 is cut into section 26 to provide flexibility for ease of installation and removal of the device.

A generally horizontal arm identified at 30 has one end integral with section 26 and extends radially outward, oppositely disposed from the gap, to an exposed end 32. End 32 as viewed in the vertical plane extends inclinedly upwards and inwards toward the body of the pump. The arm in plan view has the general shape of a trapezoid with a somewhat curved base which is integral.

The arm has a vertical recess 34 which extends from section 26 radially outwards to end 32. The recess has a flat bottom surface essentially coplanar with the top surface of section 16. The width of the recess is only slightly larger than the width of linkage 22. The depth of the recess typically is about 0.030 inches.

Figure 3:
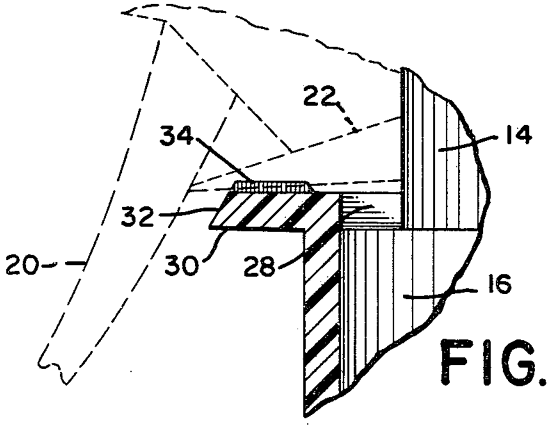
FIG. 3 and 4 are detail views illustrating actuation of the trigger of the pump of FIG. 1 when the device of FIG. 1 is in locking position.
Figure 6:
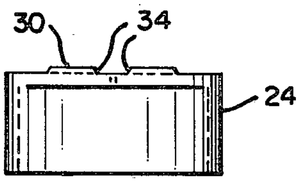
FIG. 6 is a view taken along line 6—6 in FIG. 5.
Figure 4:
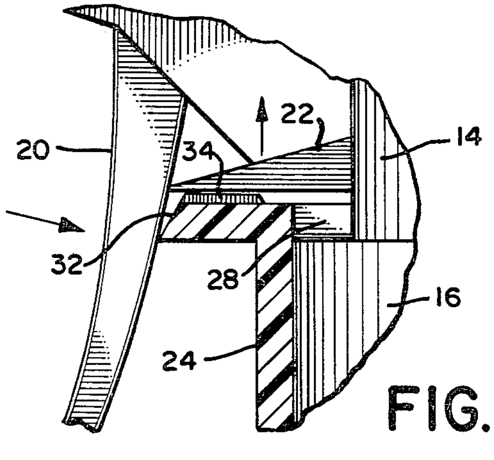
Figure 7:
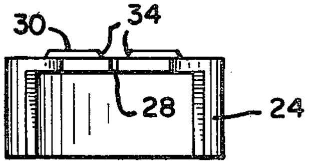
FIG. 7 is a view taken along line 7—7 in FIG. 5.

In use, the device is removably snapped onto cap 16 with section 26 resting on top of the cap. The device is manually rotatable about the cap. When the device is rotated until recess 34 is aligned with and disposed underneath the linkage 22, which then engages the recess, and end 32 is aligned with, but is inwardly spaced from, trigger 20, the pump is locked. The trigger, when squeezed, can move inwardly about 0.10 inches and then engages end 32 of arm 30. This action cannot operate the pump. However, as shown in FIGS. 3 and 4, when the pump is locked and the trigger is squeezed, the linkage 22 is slightly raised and is partially disengaged from the recess. Then, while the trigger is held in this position, manual rotation of the device will swing the arm out of alignment with the trigger and at the same time will fully disengage the linkage from the recess. Typically, about one quarter turn or ninety degrees of rotation is sufficient. The combination of the two motions, trigger actuation and manual rotation, enables the pump to be unlocked and then to be operated in normal fashion.

What is claimed is:

1. A device for use with a manually operable trigger pump having a pump body and a circular cap disposed below the body and adapted to engage a container having material to be pumped out by said pump, said pump having a generally vertical trigger pivotally coupled at its upper end to said body and a linkage coupled at one end to said trigger at a point intermediate the ends of the trigger, said linkage extending inclinedly upwardly upwards from said coupled end into said body, said linkage being moved into said body when said trigger is pivoted in a vertical plane toward said body to operate said pump, said device comprising:

locking means securable to the outer surface of said cap in such manner as to be manually rotatable about said cap; and a generally horizontal arm integral at one end with said locking means and when said means is secured to the cap extending radially outward from said cap, said arm having in its top surface a radially extending recess, said means when secured to said cap being rotatable to a locked position at which the other end of the arm is aligned with but is inwardly spaced from the trigger and said linkage engages said recess, the separation between said trigger and the other end of said arm, when the means is in locked position, being large enough to allow sufficient pivotal movement of the trigger toward the pump body to raise the linkage partially out of engagement with the recess and small enough to prevent trigger operation of the pump, whereby the pump is locked into an inoperative position, said pump being unlocked and in operative position when the trigger is pivoted inwardly to partially disengage the linkage in the recess and the locking means is simultaneously rotated to move the other end of the arm out of alignment with the trigger whereby the linkage is fully disengaged from the recess and the trigger can be pivoted in normal operative manner.

2. The device of claim 1, wherein said means and arm constitute a unit which can be manually attached to and removed from said cap.

3. The device of claim 2, wherein said means has a generally annular shape.

4. The device of claim 3 wherein said means is an annular member which in horizontal cross section has the general shape of a C.

5. The device of claim 4 wherein said member has a flat top horizontal surface.

6. The device of claim 5 wherein the recess in said arm has a flat bottom surface essentially coincident with the top horizontal surface of said member.

7. The device as set forth in claim 6 wherein said arm in top plan view generally defines a trapezoid, the base of the trapezoid being somewhat curved and integral with said member.

8. The device as set forth in claim 7, wherein the depth of said recess is approximately 0.030 inches.

9. The device as set forth in claim 8 wherein the separation between said trigger and the other end of the arm, when the means is in locked position, is approximately 0.10 inches.

10. In combination with a manually operable trigger pump having a pump body and a circular cap disposed below the body and adapted to engage a container having material to be pumped out by said pump, said pump having a generally vertical trigger pivotally coupled at its upper end to said body and a linkage coupled at one end to said trigger at a point intermediate the ends of the trigger, said linkage extending inclinedly upwards from said coupled end into said body, said linkge being moved into said body when said trigger is pivoted in a vertical plane toward said body to operate said pump:

locking means secured to the outer surface of said cap and manually rotatable about said cap; and a generally horizontal arm integral at one end with said locking means and extending radially outward from said cap, said arm having in its top surface a radially extending recess, said means being rotatable to a locked position at which the other end of the arm is aligned with but is inwardly spaced from the trigger and said linkage engages said recess, the separation between said trigger and the other end of said arm, when the means is in locked position, being large enough to allow sufficient pivotal movement of the trigger toward the pump body to raise the linkage partially out of engagement with the recess and small enough to prevent trigger operation of the pump, whereby the pump is locked into an inoperative position, said pump being unlocked and in operative position when the trigger is pivoted inwardly to partially disengage the linkage in the recess and the locking means is simultaneously rotated to move the outer end of the arm out of alignment with the trigger whereby the linkage is fully disengaged from the recess and the trigger can be pivoted in normal operative manner.

* * * * *